United States Patent
Chen et al.

(10) Patent No.: US 10,506,074 B2
(45) Date of Patent: Dec. 10, 2019

(54) PROVIDING SIMULTANEOUS ACCESS TO CONTENT IN A NETWORK

(71) Applicant: Verizon Patent and Licensing Inc., Arlington, VA (US)

(72) Inventors: Ming Chen, Bedford, MA (US); Dahai Ren, Lincoln, MA (US); Lei Zhang, Frisco, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 260 days.

(21) Appl. No.: 14/865,750

(22) Filed: Sep. 25, 2015

(65) Prior Publication Data

US 2017/0094016 A1 Mar. 30, 2017

(51) Int. Cl.
*H04L 29/08* (2006.01)
*H04L 9/08* (2006.01)

(52) U.S. Cl.
CPC .............. *H04L 67/325* (2013.01); *H04L 9/08* (2013.01)

(58) Field of Classification Search
CPC ..... H04L 67/325; H04L 9/08; H04L 63/0428; H04L 9/0872; H04L 2209/60; H04L 2209/80
See application file for complete search history.

(56) References Cited

U.S. PATENT DOCUMENTS

| | | | | |
|---|---|---|---|---|
| 6,442,603 B1 * | 8/2002 | Borella | ............... | G06F 16/9577 709/218 |
| 8,984,137 B2 * | 3/2015 | Aisen | ................. | H04L 43/0852 709/226 |
| 2004/0071085 A1 * | 4/2004 | Shaham | ................ | H04L 1/0002 370/230 |
| 2006/0039565 A1 * | 2/2006 | Kim | ....................... | H04N 5/913 380/277 |
| 2006/0268713 A1 * | 11/2006 | Lundstrom | ............. | H04L 47/10 370/235 |
| 2008/0076470 A1 * | 3/2008 | Ueda | ................... | H04N 21/4126 455/556.1 |
| 2008/0189429 A1 * | 8/2008 | DaCosta | ........... | H04L 29/06027 709/231 |
| 2009/0054001 A1 * | 2/2009 | Westerberg | ......... | H04L 43/0858 455/67.11 |
| 2009/0290554 A1 * | 11/2009 | Siltala | ............... | H04W 36/0066 370/331 |
| 2010/0119069 A1 * | 5/2010 | Kamikura | ............. | H04L 9/0841 380/255 |

(Continued)

*Primary Examiner* — Kamal B Divecha
*Assistant Examiner* — Sandarva Khanal

(57) ABSTRACT

A device may receive content to be provided to a plurality of receiver devices. The device may encrypt the content to form encrypted content. The device may provide the encrypted content to the plurality of receiver devices. The device may determine a plurality of respective latency values for the plurality of receiver devices. A latency value, of the plurality of latency values, may identify a length of time between the device sending information to a respective receiver device, of the plurality of receiver devices, and the information being received by the respective receiver device. The device may provide, to the plurality of receiver devices, a security key for decrypting the encrypted content. The security key may be provided, based on the plurality of latency values, to cause the plurality of receiver devices to receive the security key substantially simultaneously.

20 Claims, 5 Drawing Sheets

(56) References Cited

U.S. PATENT DOCUMENTS

| | | | |
|---|---|---|---|
| 2012/0131129 A1* | 5/2012 | Agarwal | H04L 43/0852 709/216 |
| 2012/0281840 A1* | 11/2012 | Rafsky | H04L 9/0819 380/279 |
| 2013/0170507 A1* | 7/2013 | Hsueh | H04L 63/0428 370/503 |
| 2014/0181241 A1* | 6/2014 | Manula | H04L 67/1097 709/217 |
| 2015/0026334 A1* | 1/2015 | Choi | H04L 67/10 709/224 |
| 2015/0195171 A1* | 7/2015 | Mermoud | H04L 43/0864 370/253 |
| 2016/0191592 A1* | 6/2016 | Asveren | H04L 65/608 709/231 |
| 2016/0337434 A1* | 11/2016 | Bajraktari | G06F 16/60 |
| 2017/0041858 A1* | 2/2017 | Tong | H04W 48/16 |

\* cited by examiner

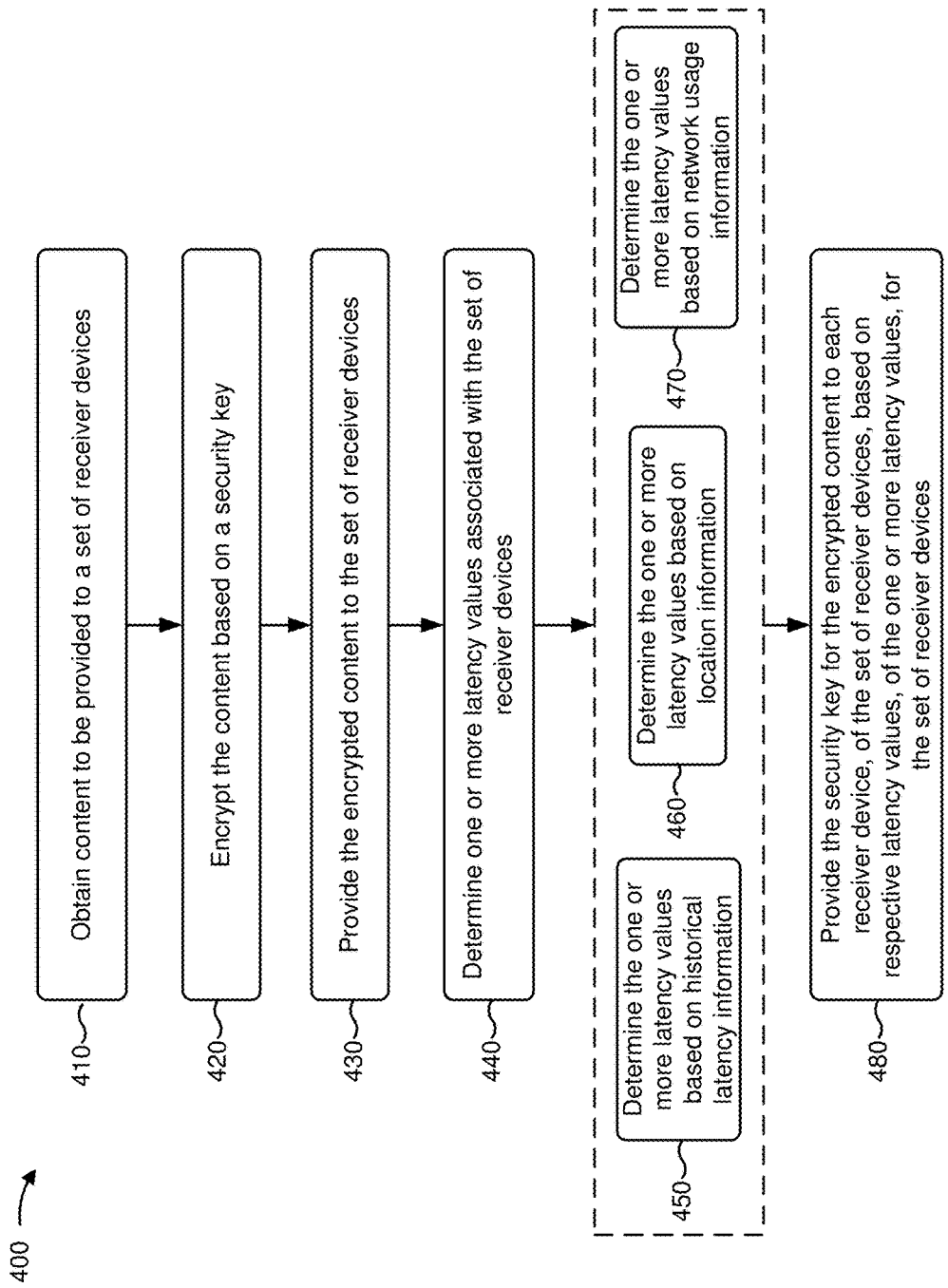

PROVIDING SIMULTANEOUS ACCESS TO CONTENT IN A NETWORK

BACKGROUND

A provider device may provide content to a set of receiver devices via a network (e.g., a cellular network, a wired network, a wireless network, a combination of types of networks, etc.). As the content travels through the network to the set of receiver devices, the network may cause delays in the reception of the content by the set of receiver devices (e.g., based on travel time of the content through a wired/wireless connection, based on processing delays at network components, based on queueing delays at network components, etc.), which may lead to latency between the provider device and the set of receiver devices.

BRIEF DESCRIPTION OF THE DRAWINGS

FIG. 4 is a flow chart of an example process for providing substantially simultaneous access to content via a network.

DETAILED DESCRIPTION OF PREFERRED EMBODIMENTS

The following detailed description of example implementations refers to the accompanying drawings. The same reference numbers in different drawings may identify the same or similar elements.

A provider device may provide content (e.g., video content, audio content, text content, an application, etc.) to a set of receiver devices via a network. The network may include, for example, a Long Term Evolution (LTE) network, a WiFi network, a wired network (e.g., a fiber-optic network, a copper-wire network, etc.), or a combination of types of networks (e.g., an LTE network in combination with a "last mile" network of a fiber-optic network or a WiFi network, or the like). Certain content may be sensitive to differences in receipt time between receiver devices. For example, if a corporation provides a quarterly earnings report to the set of receiver devices, even differences in receipt time on the order of milliseconds can create opportunities for advantageous market trades "ahead of the news."

Implementations described herein permit the provider device to reduce the differences in receipt time between receiver devices. The provider device may encrypt the content and may provide the content to each of the receiver devices. The provider device may further determine one or more latency values for each of the receiver devices, and may provide a security key, to decrypt the encrypted content, to the receiver devices based on the respective latency values. The receiver devices may receive the security key substantially simultaneously (e.g., less than a millisecond of difference, less than a microsecond of difference, etc.), and may decrypt the encrypted content at substantially the same time (e.g., within a millisecond of each other, within a microsecond of each other, etc.). In this way, the provider device improves network functionality by reducing latency-related delays or differences between different receiver devices. Further, the provider device collects latency information relating to a variety of situations, which permits a network administrator to diagnose causes of the latency and, thereby, improve network performance.

Figure 1A:
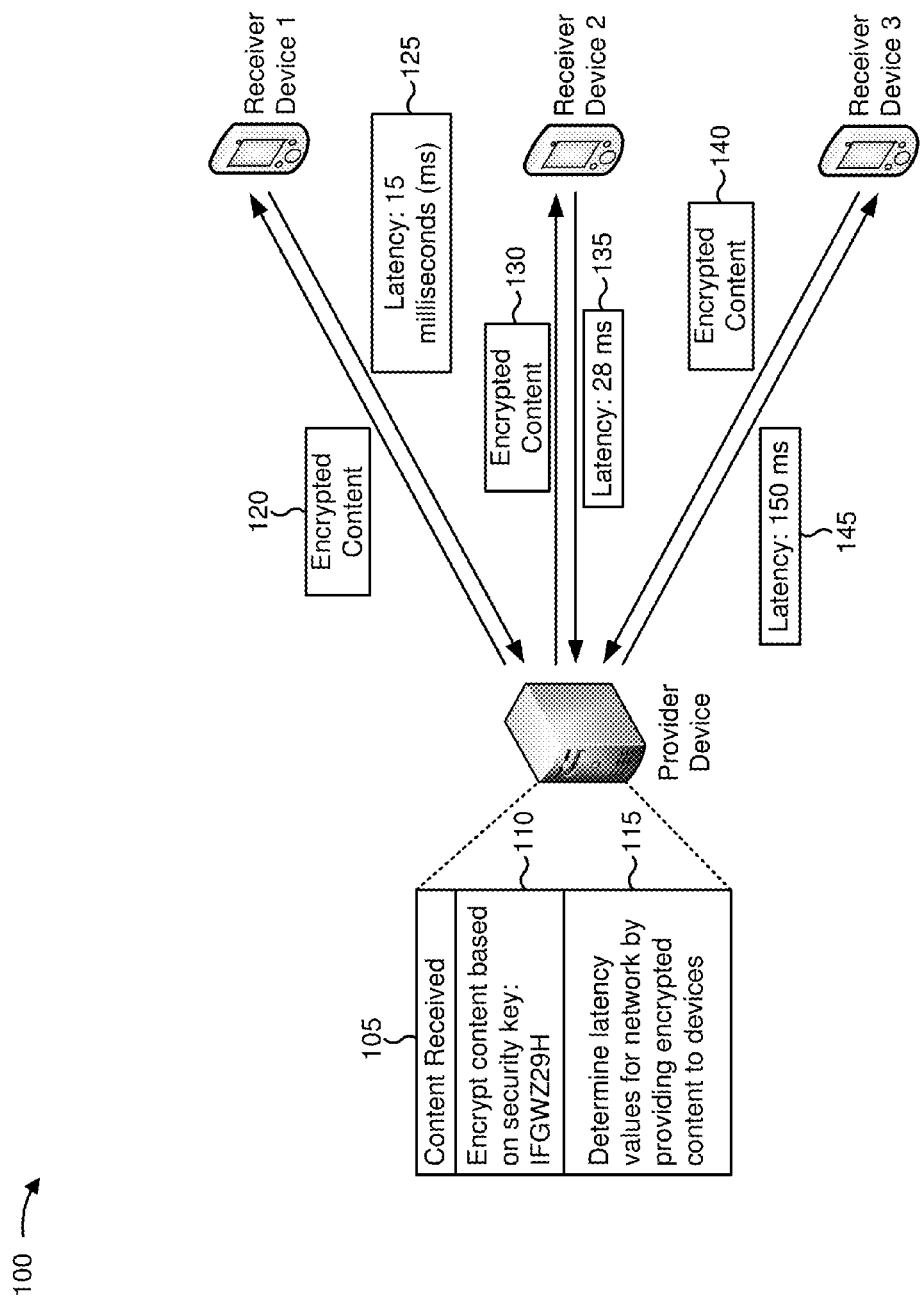
FIGS. 1A and 1B are diagrams of an overview of an example implementation described herein.
Figure 1B:
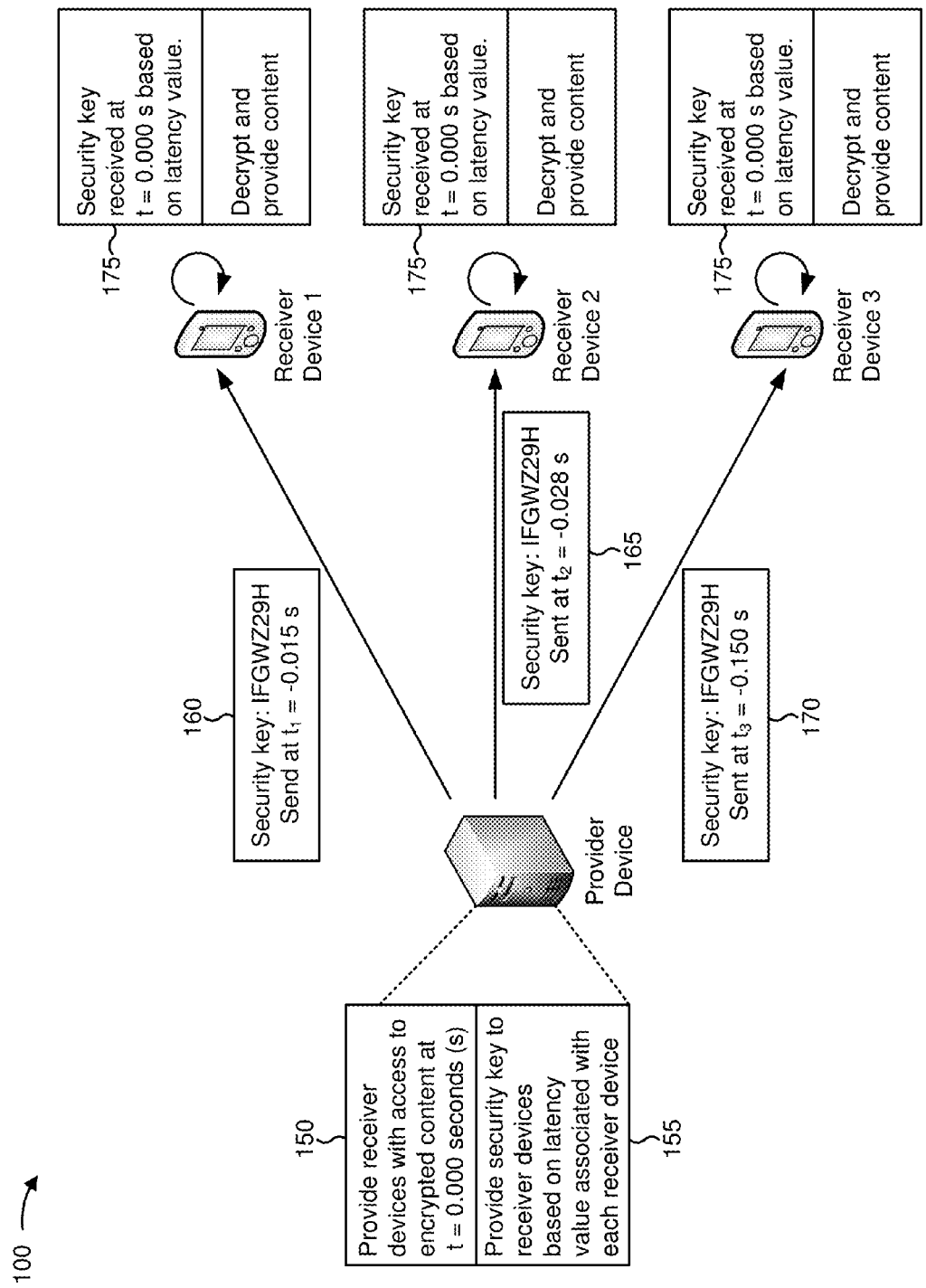

FIGS. 1A and 1B are diagrams of an overview of an example implementation 100 described herein. As shown in FIG. 1A, and by reference number 105, a provider device may receive content to provide to a set of receiver devices (e.g., Receiver Device 1, Receiver Device 2, and Receiver Device 3). Assume that the provider device receives the content to provide the receiver devices with substantially simultaneous access to the content (e.g., within a millisecond of each other, within a microsecond of each other, etc.). As shown by reference number 110, the provider device may encrypt the content based on a security key (e.g., IFGWZ29H). As shown by reference number 115, the provider device may determine latency values for a network by providing the encrypted content to the set of receiver devices via the network. For example, the provider device may receive confirmation messages from the set of receiver devices, and may determine the latency values based on the confirmation messages. In some implementations, the provider device may determine the latency values in another fashion, as described in more detail in connection with FIG. 4, below.

As shown by reference number 120, the provider device may provide the encrypted content to Receiver Device 1. As shown by reference number 125, the provider device may receive information indicating that a latency value for Receiver Device 1 is equal to 15 milliseconds (ms). As shown by reference number 130, the provider device may provide the encrypted content to Receiver Device 2. As shown by reference number 135, the provider device may receive information indicating that a latency value for Receiver Device 2 is equal to 28 ms. As shown by reference number 140, the provider device may provide the encrypted content to Receiver Device 3. As shown by reference number 145, the provider device may receive information indicating that a latency value for Receiver Device 3 is equal to 150 ms.

As shown in FIG. 1B and by reference number 150, the provider device may determine to provide the receiver devices with access to the encrypted content at a particular time (e.g., t=0.000 seconds(s)). As shown by reference number 155, the provider device may provide the security key (e.g., IFGWZ29H) to the receiver devices based on the latency values associated with the receiver devices. As shown by reference number 160, the provider device may provide the security key to Receiver Device 1 at $t_1$=−0.015 seconds(s) (e.g., 0.015 seconds prior to t=0.000 s, based on the latency value of 15 ms associated with Receiver Device 1). As shown by reference number 165, the provider device may provide the security key to Receiver Device 2 at $t_2$=−0.028 s (e.g., based on the latency value of 28 ms associated with Receiver Device 2). As shown by reference number 170, the provider device may provide the security key to Receiver Device 3 at $t_3$=−0.150 s (e.g., based on the latency value of 150 ms associated with Receiver Device 3).

As shown by reference number 175, Receiver Device 1, Receiver Device 2, and Receiver Device 3 receive the security key substantially simultaneously (e.g., at t=0.000 s) based on the provider device transmitting the security key at different times, corresponding to the different latency values associated with the set of receiver devices. As further shown, Receiver Device 1, Receiver Device 2, and Receiver Device 3 decrypt the content, and provide the content to their respective users. In this way, the provider device improves network functionality by reducing latency-related delays or differences in access to content between different receiver devices.

Figure 2:
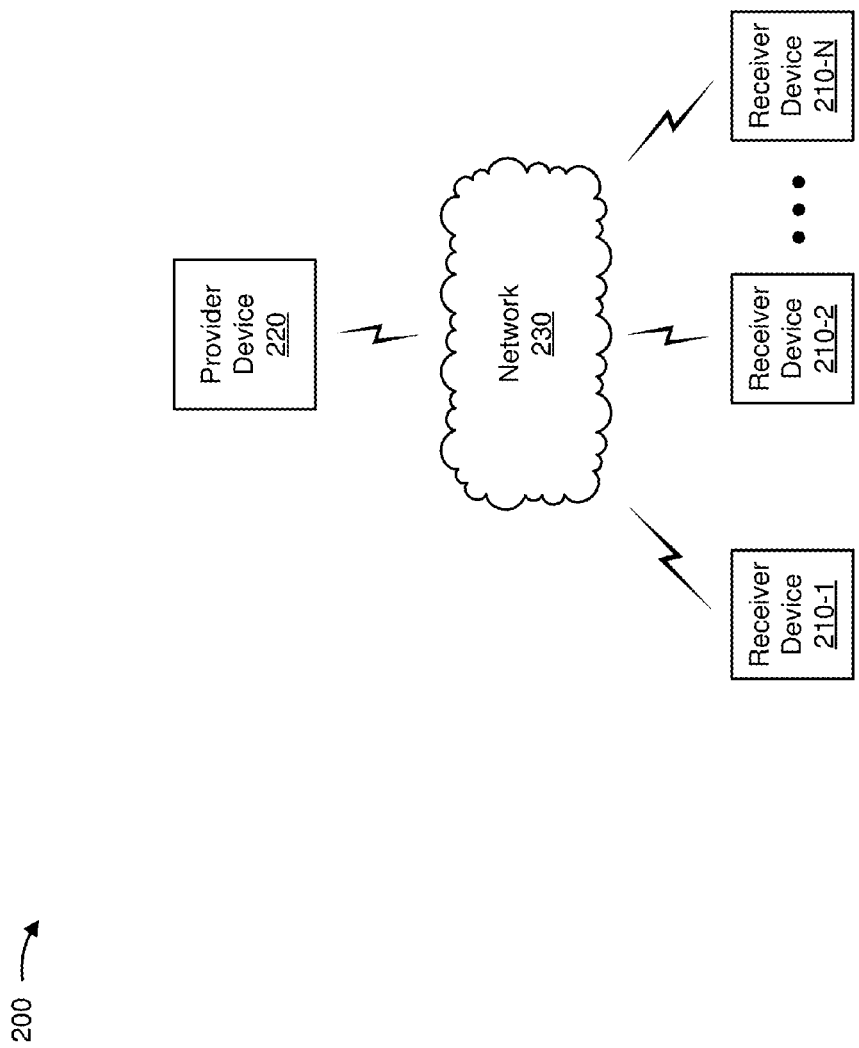
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include two or more receiver devices 210-1 through 210-N (N≥1) (hereinafter referred to collectively as "receiver devices 210," and individually as "receiver device 210"), a provider device 220, and a network 230. Devices of environment 200 may interconnect via wired connections, wireless connections, or a combination of wired and wireless connections.

Receiver device 210 may include one or more devices capable of receiving, generating, storing, processing, and/or providing information. For example, receiver device 210 may include a communication device, such as a mobile phone (e.g., a smart phone, etc.), a tablet computer, a laptop computer, a desktop computer, a handheld computer, a wearable communication device (e.g., a smart wristwatch, a pair of smart eyeglasses, etc.), a server device, or a similar type of device. Receiver device 210 may communicate with provider device 220 via network 230.

Provider device 220 may include one or more devices capable of receiving, generating, storing, processing, and/or providing information. For example, provider device 220 may include a communication device, such as a server, a security device (e.g., a firewall, a gateway, an access point, etc.), or a similar device. In some implementations, provider device 220 may include a cellular network device, such as a mobility management entity (MME), a serving gateway (SGW), a policy and charging rules function (PCRF), a PDN gateway (PGW), a base station controller (BSC), an operations and maintenance centre (OMC), a network management system (NMS) a network management center (NMC), a home subscriber server (HSS), a proxy call session control function (P-CSCF), an interrogating call session control function (I-CSCF), a serving call session control function (S-CSCF), or a similar type of network device. Provider device 220 may communicate with receiver device 210 via network 230.

Network 230 may include one or more wired and/or wireless networks. For example, network 230 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
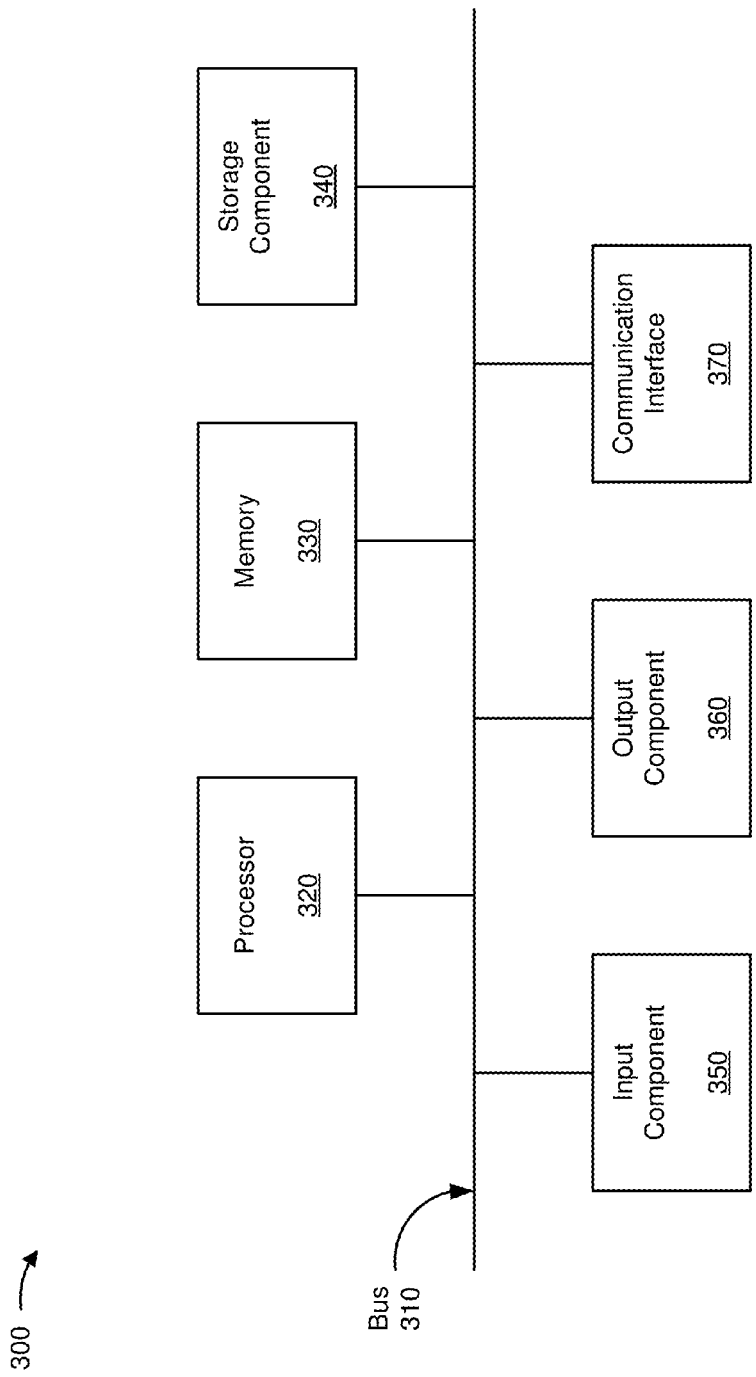
FIG. 3 is a diagram of example components of one or more devices of FIG. 2.

FIG. 3 is a diagram of example components of a device 300. Device 300 may correspond to receiver device 210 and/or provider device 220. In some implementations, receiver device 210 and/or provider device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing substantially simultaneous access to content via a network. In some implementations, one or more process blocks of FIG. 4 may be performed by provider device 220. In some implementations, one or more process blocks of FIG. 4 may be performed by another device or a group of devices separate from or including provider device 220, such as receiver device 210.

As shown in FIG. 4, process 400 may include obtaining content to be provided to a set of receiver devices (block 410). For example, provider device 220 may obtain content to be provided to a set of receiver devices 210. Provider device 220 may receive the content from a content provider (e.g., from another device associated with the content provider, etc.). Additionally, or alternatively, provider device 220 may receive the content from a cellular network device. Provider device 220 may receive the content in order to provide the set of receiver devices 210 with simultaneous or substantially simultaneous access to the content.

The content may include information to be simultaneously or substantially simultaneously provided to the set of receiver devices 210. For example, the content may include video content (e.g., an advertisement, a video recording of an event, a movie, a television program, a video conference, etc.), audio content (e.g., a voice recording, a song, an advertisement, an audio recording of an event, a voice call, etc.), textual content (e.g., a contract, a financial disclosure, a release of a book, etc.), an application (e.g., a smartphone application, a computer application, etc.), a batch of data, or the like.

As further shown in FIG. 4, process 400 may include encrypting the content based on a security key (block 420). For example, provider device 220 may encrypt the content based on a security key. In some implementations, provider device 220 may generate the security key (e.g., periodically, based on receiving the content, etc.). In some implementations, provider device 220 may encrypt the content based on an encryption algorithm, such as a symmetric cipher (e.g., Advanced Encryption Standard (AES) encryption, Twofish, Serpent, Blowfish, etc.), or the like.

In some implementations, provider device 220 may receive the security key (e.g., in association with the content). In such cases, provider device 220 may receive content that is encrypted by another device, and may receive the security key to provide with the content for decrypting the content. Provider device 220 may provide the encrypted content and the security key to the set of receiver devices 210. By receiving encrypted content from another device, provider device 220 conserves processor resources that would otherwise be used to encrypt the content.

As further shown in FIG. 4, process 400 may include providing the encrypted content to the set of receiver devices (block 430). For example, provider device 220 may provide the encrypted content to the set of receiver devices 210. Provider device 220 may provide the encrypted content via network 230. Network 230 may introduce delay (latency) between provider device 220 and receiver devices 210. The delay may be caused by, for example, travel time of the content through a wired or wireless connection of network 230, processing delays at cellular network devices of network 230, queueing delays at cellular network devices and/or other devices, or the like.

In some implementations, provider device 220 may divide the encrypted content into a set of blocks, and may provide the set of blocks to receiver device 210. For example, provider device 220 may sequentially provide the set of blocks, in association with information identifying a position of each block in relation to the other blocks (e.g., first, second, last, etc.). Provider device 220 may determine latency values for two or more blocks of the set of blocks (e.g., based on a maximum latency value, based on a minimum latency value, based on a mean latency value, based on a weighted average latency value, based on a latency value for a most recently transmitted block, etc.). In this way, provider device 220 provides the encrypted content in a set of blocks, which reduces network congestion and improves accuracy of the latency value.

As further shown in FIG. 4, process 400 may include determining one or more latency values associated with the set of receiver devices (block 440). For example, provider device 220 may determine one or more latency values associated with the set of receiver devices 210. A latency value may identify a length of time that elapses between provider device 220 transmitting information (e.g., the encrypted content, the security key, a reference message, etc.), and receiver device 210 receiving the transmitted information. In some implementations, provider device 220 may determine the one or more latency values based on historical latency information (e.g., as in block 450, below), based on location information (e.g., as in block 460, below), based on network usage information (e.g., as in block 470, below), or based on other information.

In some implementations, provider device 220 may train a predictive model to determine a latency value. For example, provider device 220 may identify a relationship between known latency values and known input values relating to the known latency values (e.g., historical latency information, location information, network usage information, etc.). Based on the relationship, provider device 220 may predict an unknown latency value based on known input values. For example, provider device 220 may input, to the predictive model, historical latency information, location information, and/or network usage information relating to receiver device 210. The predictive model may output a predicted latency value based on the historical latency information, location information, and/or network usage information. By training a predictive model, provider device 220 improves accuracy of predicted latency values and, thereby, improves a likelihood that the set of receiver devices 210 accesses the content simultaneously or substantially simultaneously.

In some implementations, provider device 220 may adjust parameters of the predictive model. For example, provider device 220 may use the predictive model to determine a predicted latency value for receiver device 210. Provider device 220 may determine an actual latency value for receiver device 210, and may compare the predicted latency value to the actual latency value. Based on a difference between the predicted latency value and the actual latency value, provider device 220 may adjust parameters of the predictive model. In this way, provider device 220 trains a predictive model, and adjusts parameters of the predictive model to improve accuracy of predicted latency values, which improves accuracy of the determined latency values and, thereby, improves network functionality.

In some implementations, the latency value may relate to a processing speed of receiver device 210. For example, assume that a first receiver device 210 is capable of decrypting content in 0.05 seconds, and assume that a second receiver device 210 is capable of decrypting the same content in 0.08 seconds (e.g., based on the first receiver device 210 having a faster processor than the second receiver device 210). In such a case, provider device 220 may determine a first latency value for the first receiver device 210, and a second latency value for the second receiver device 210. The second latency value may be 0.03 seconds greater than the first latency value (e.g., based on the difference in processing speed between the first receiver device 210 and the second receiver device 210). Provider device 220 may determine the latency values based on information received from the receiver devices 210, based on a device type of the receiver devices 210, based on historical information associated with the receiver devices 210, or the like. In this way, provider device 220 determines latency values based on processing speeds of receiver devices 210, which improves a likelihood that the content is decrypted simultaneously or substantially simultaneously.

As further shown in FIG. 4, process 400 may include determining the one or more latency values based on historical latency information (block 450). For example, provider device 220 may determine a latency value based on historical latency information. In some implementations, the historical latency information may relate to a particular receiver device 210. For example, provider device 220 may store information identifying historical latency values for the particular receiver device 210, and may determine a latency value based on the historical latency values (e.g., based on a minimum latency value, a maximum latency value, an average latency value, a median latency value, a weighted average latency value, etc.). In some implementations, provider device 220 may input the historical latency information to a predictive model to determine the latency value.

Additionally, or alternatively, the historical latency information may relate to a receiver device 210 and a particular type of network. For example, assume that provider device 220 experiences a first latency value when communicating with receiver device 210 via a connection with an LTE network, and assume that provider device 220 experiences a second, different, latency value when communicating with receiver device 210 via a connection with a WiFi network. In some implementations, provider device 220 may store information associating receiver device 210 with the first latency value when connected to an LTE network, and the second latency value when connected to a WiFi network.

In some implementations, provider device 220 may request latency information, and may store historical latency information based on the requested latency information. For example, provider device 220 may send a signal to receiver device 210 requesting latency information, and may receive a response from receiver device 210 based on the signal. Based on the response, provider device 220 may determine the latency value, and may store the determined latency value. In some implementations, provider device 220 may periodically send the signals to receiver device 210 (e.g., once per day, once per hour, etc.), and may store latency values determined based on the periodic signals. Additionally, or alternatively, provider device 220 may send a signal, to receiver device 210, based on receiving content to provide, and may determine the latency value based on a response, to this signal, from the receiver device 210.

As further shown in FIG. 4, process 400 may include determining the one or more latency values based on location information (block 460). For example, provider device 220 may determine the one or more latency values based on location information. The location information may identify respective locations of the set of receiver devices 210 (e.g., based on a cell global identity (CGI), an enhanced cell global identity (E-CGI), a location area code (LAC), a latitude/longitude of the location, etc.). For example, if the set of receiver devices 210 are located at a particular building, in a particular network cell, or the like, the location information may identify the particular building or network cell. In a situation where the set of receiver devices 210 are located at different locations (e.g., different cells, different sectors of the cellular network, areas served by different base stations, areas served by different networks or types of networks, etc.), location information corresponding to different receiver devices 210, of the set of receiver devices 210, may identify the different locations.

The location information may be associated with latency information. For example, the location information may identify latency values for a particular receiver device 210 at the location, for all receiver devices 210 at the location, for similar receiver devices 210 at the location (e.g., similar based on a make, model, firmware version, operating system, connection type, content type, signal quality, signal strength, etc.), or the like. In some implementations, the location information may identify latency values for different types of locations. For example, the location information may identify a latency value for receiver devices 210 in a moving train, at a sports venue, in a subway station, in a car, in a building, or the like.

In some implementations, the location information may be associated with a particular receiver device 210. For example, location information for the particular receiver device 210 may identify latency values between provider device 220 and the particular receiver device 210, when the particular receiver device 210 is located at different locations. In some implementations, the different locations may include locations that the particular receiver device 210 is likely to be found (e.g., a location on a daily commute, a home location, a workplace location, etc.).

As further shown in FIG. 4, process 400 may include determining the one or more latency values based on network usage information (block 470). For example, provider device 220 may determine the one or more latency values based on network usage information. The network usage information may relate to a particular area (e.g., an area associated with a particular base station, with a particular wireless access point, with a particular gateway, etc.), and may identify a quantity of mobile devices (e.g., receiver devices 210, mobile devices that are not to receive the content, etc.) that are accessing a network at the particular area. In some implementations, the network usage information may identify network usage (e.g., bandwidth, data sessions, radio frequency sessions, etc.) associated with the quantity of mobile devices. In some implementations, provider device 220 may determine a latency value by inputting the network usage information to a predictive model.

In some implementations, the network usage information may relate to a change in network usage for an area. For example, if the area experiences a significant increase or decrease (e.g., sufficient to cause a change in latency values for the area) in a quantity of receiver devices 210 and/or in network usage by the quantity of receiver devices 210, the network usage information may indicate that a change in latency values is likely to occur. When provider device 220 detects the significant increase or decrease in network usage or quantity of receiver devices 210, provider device 220 may adjust latency values for the area accordingly. In this way, provider device 220 adjusts latency values based on network usage for an area, which improves accuracy of the latency values and improves network functionality.

As further shown in FIG. 4, process 400 may include providing the security key for the encrypted content to each receiver device, of the set of receiver devices, based on respective latency values, of the one or more latency values, for the set of receiver devices (block 480). For example, provider device 220 may provide the security key for the encrypted content to each receiver device 210 of the set of receiver devices 210. The set of receiver devices 210 may use the security keys to decrypt and access the encrypted content simultaneously or substantially simultaneously.

Provider device 220 may provide the security key based on the latency values corresponding to the set of receiver devices 210. For example, if a first receiver device 210 is associated with a latency value of 100 ms, and a second receiver device 210 is associated with a latency value of 200 ms, provider device 220 may send the security key to the second receiver device 210 100 ms before sending the security key to the first receiver device 210. In this way, provider device 220 improves the likelihood that the first receiver device 210 and the second receiver device 210 simultaneously or substantially simultaneously receive the security key, which prevents either receiver device 210 from accessing the encrypted content before the other.

In some implementations, provider device 220 may provide the security key via a particular type of network based on latency values associated with different types of networks. For example, assume that an LTE network is associated with a latency value of 20 ms with regard to receiver device 210, and assume that a WiFi network is associated with a latency value of 10 ms with regard to that same receiver device 210. In that case, provider device 220 may determine to provide the security key to receiver device 210 via the WiFi network, which reduces latency associated with providing the security key and, thereby, improves a likelihood that receiver devices 210 access the content simultaneously or substantially simultaneously.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the provider device improves network functionality by reducing latency-related delays or differences between different receiver devices when accessing content. Further, the provider device collects latency information relating to a variety of situations, which permits a network administrator to diagnose causes of the latency and, thereby, improve network performance.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive content to be provided to a plurality of receiver devices;
      encrypt an entirety of the content to form encrypted content;

divide the encrypted content into a set of blocks;
provide the encrypted content to the plurality of receiver devices,
the encrypted content being provided sequentially in the set of blocks in association with information identifying a position of each block in relation to other blocks,
each of the plurality of receiver devices receiving a same entirety of the encrypted content;
determine a plurality of respective latency values for the plurality of receiver devices,
the plurality of respective latency values being determined based on a type of network that provides the encrypted content or a security key to the plurality of receiver devices,
a latency value, of the plurality of respective latency values, identifying a length of time between the device sending information to a respective receiver device, of the plurality of receiver devices, and the information being received by the respective receiver device,
each latency value, of the plurality of respective latency values, being based on a predictive model, the predictive model being based on:
location information related to the respective receiver device of the plurality of receiver devices,
historical latency values for the respective receiver device of the plurality of receiver devices,
the historical latency values including a first latency value associated with a first connection with a first network and a second latency value associated with a second connection with a second network,
the first network being a different type of network than the second network, and
network usage information relating to the respective receiver device;
compare latency values for a first type of network and a second type of network;
provide, to the plurality of receiver devices, the security key for decrypting the encrypted content,
the security key being provided, based on the plurality of respective latency values, to cause the plurality of receiver devices to receive the security key simultaneously or less than a millisecond of difference,
the security key being provided via a particular type of network, and
the plurality of receiver devices decrypting, based on receiving the security key, the encrypted content within a millisecond of difference, and
the security key being selectively provided to a receiver device, of the plurality of receiver devices, via the first type of network or the second type of network based on comparing the latency values; and
train the predictive model based on historical latency information for the particular type of network,
the historical latency information being associated with a length of time that elapses between transmission of the security key via the particular type of network and receiving the security key via the particular type of network.

2. The device of claim 1, where the one or more processors, when determining the plurality of respective latency values, are to:
determine the plurality of respective latency values based on respective delays associated with providing the encrypted content to the plurality of receiver devices.

3. The device of claim 1, where the one or more processors, when determining the plurality of respective latency values, are to:
determine the plurality of respective latency values based on network usage information for a network via which the security key is provided to one or more receiver devices of the plurality of receiver devices,
the network usage information identifying a quantity of devices accessing the network.

4. The device of claim 3, where the network usage information identifies latency values relating to one or more devices of the quantity of devices.

5. The device of claim 1, where the location information includes a predicted location associated with a particular receiver device.

6. The device of claim 1, where the one or more processors, when determining the plurality of respective latency values, are to:
determine the plurality of respective latency values based on receiving messages from the plurality of receiver devices.

7. The device of claim 1, where the one or more processors, when determining the plurality of respective latency values, are to:
detect a change in network usage,
the change in network usage relating to a quantity of devices connected to a network,
the network providing the content to one or more receiver devices of the plurality of receiver devices; and
determine the plurality of respective latency values based on the change in network usage.

8. A non-transitory computer-readable medium storing instructions, the instructions comprising:
one or more instructions that, when executed by one or more processors, cause the one or more processors to:
receive content to be provided to a plurality of receiver devices;
encrypt an entirety of the content, based on a security key, to form encrypted content;
divide the encrypted content into a set of blocks;
provide the encrypted content to the plurality of receiver devices,
the encrypted content being provided sequentially in the set of blocks in association with information identifying a position of each block in relation to other blocks,
each of the plurality of receiver devices receiving a same entirety of the encrypted content;
determine a plurality of respective latency values for the plurality of receiver devices,
the plurality of respective latency values being determined based on a type of network that provides the encrypted content or the security key to the plurality of receiver devices,
a latency value, of the plurality of respective latency values, identifying a length of time that elapses between a device sending information, to a respective receiver device of the plurality of receiver devices, and the information being received by the respective receiver device, each latency value, of the plurality of respective latency values, being based on a predictive model, the predictive model being based on:
    location information related to the respective receiver device of the plurality of receiver devices,
    historical latency values for the respective receiver device of the plurality of receiver devices,
        the historical latency values including a first latency value associated with a first connection with a first network and a second latency value associated with a second connection with a second network,
        the first network being a different type of network than the second network, and
    network usage information relating to the respective receiver device;
compare latency values for a first type of network and a second type of network;
provide, to the plurality of receiver devices, the security key for decrypting the encrypted content,
    the security key being provided, based on the plurality of respective latency values, to cause the plurality of receiver devices to receive the security key simultaneously or less than a millisecond of difference,
    the security key being provided via a particular type of network,
    the plurality of receiver devices decrypting, based on receiving the security key, the encrypted content within a millisecond of difference, and
    the security key being selectively provided to a receiver device, of the plurality of receiver devices, via the first type of network or the second type of network based on comparing the latency values; and
train the predictive model based on historical latency information for the particular type of network,
    the historical latency information being associated with a length of time that elapses between transmission of the security key via the particular type of network and receiving the security key via the particular type of network.

9. The non-transitory computer-readable medium of claim 8, where the one or more instructions, that cause the one or more processors to determine the plurality of respective latency values, cause the one or more processors to:
determine the plurality of respective latency values based on receiving messages from the plurality of receiver devices.

10. The non-transitory computer-readable medium of claim 8, where the location information is associated with information identifying historical latency values at respective locations; and
where the one or more instructions, that cause the one or more processors to determine the plurality of respective latency values, cause the one or more processors to:
    determine the plurality of respective latency values based on the historical latency values.

11. The non-transitory computer-readable medium of claim 8, where the one or more instructions, that cause the one or more processors to determine the plurality of respective latency values, cause the one or more processors to:
determine the plurality of respective latency values based on latency values for mobile devices at respective locations.

12. The non-transitory computer-readable medium of claim 8, where the one or more instructions, that cause the one or more processors to determine the plurality of respective latency values, cause the one or more processors to:
determine the plurality of respective latency values based on latency values associated with providing the encrypted content to the plurality of receiver devices.

13. The non-transitory computer-readable medium of claim 8, where the one or more instructions, that cause the one or more processors to determine the plurality of respective latency values, cause the one or more processors to:
detect a change in network usage,
    the change in network usage relating to a quantity of devices connected to a network,
        the network providing the content to one or more receiver devices of the plurality of receiver devices; and
determine the plurality of respective latency values based on the change in network usage.

14. The non-transitory computer-readable medium of claim 13,
where the network usage is associated with latency values relating to one or more devices of the quantity of devices.

15. A method, comprising:
receiving, by a device, content to be provided to a plurality of receiver devices;
encrypting, by the device, an entirety of the content to generate encrypted content;
dividing, by the device, the encrypted content into a set of blocks;
providing, by the device, the encrypted content to the plurality of receiver devices,
    the encrypted content being provided sequentially in the set of blocks in association with information identifying a position of each block in relation to other blocks,
    each of the plurality of receiver devices receiving a same entirety of the encrypted content;
determining, by the device, a plurality of respective latency values for the plurality of receiver devices,
    the plurality of respective latency values being determined based on a type of network that provides the encrypted content or a security key to the plurality of receiver devices,
    a latency value, of the plurality of respective latency values, identifying a length of time, for a respective receiver device of the plurality of receiver devices, to receive or access information sent by the device,
    each latency value, of the plurality of respective latency values, being based on a predictive model,
        the predictive model being based on:
            location information related to the respective receiver device of the plurality of receiver devices,
            historical latency values for the respective receiver device of the plurality of receiver devices,
                the historical latency values including a first latency value associated with a first connection with a first network and a second latency value associated with a second connection with a second network,
                the first network being a different type of network than the second network, and
            network usage information relating to the respective receiver device;

comparing, by the device, latency values for a first type of network and a second type of network;

providing, by the device and to the plurality of receiver devices, the security key for decrypting the encrypted content, the security key being provided, based on the plurality of respective latency values, to cause the plurality of receiver devices to receive the security key simultaneously or less than a millisecond of difference, the security key being provided via a particular type of network, the plurality of receiver devices decrypting, based on receiving the security key, the encrypted content within a millisecond of difference, and the security key being selectively provided to a receiver device, of the plurality of receiver devices, via the first type of network or the second type of network based on comparing the latency values; and training, by the device, the predictive model based on historical latency information for the particular type of network, the historical latency information being associated with a length of time that elapses between transmission of the security key via the particular type of network and receiving the security key via the particular type of network.

16. The method of claim 15, further comprising:

training the predictive model, based on past latency values relating to the plurality of receiver devices, to predict the plurality of respective latency values; and where determining the plurality of respective latency values further comprises:

determining the plurality of respective latency values based on the predictive model.

17. The method of claim 16, where training the predictive model further comprises:

training the predictive model based on latency values for one or more locations, one or more receiver devices, of the plurality of receiver devices, being located at the one or more locations.

18. The method of claim 15, where determining the plurality of respective latency values comprises:

detecting a change in network usage, the change in network usage relating to a quantity of devices connected to a network, the network providing the content to one or more receiver devices of the plurality of receiver devices; and determining the plurality of respective latency values based on the change in network usage.

19. The method of claim 15, where determining the plurality of respective latency values comprises:

determining the plurality of respective latency values based on providing the encrypted content to the plurality of receiver devices.

20. The method of claim 15, where training the predictive model comprises:

identifying a relationship between a plurality of known latency values for the plurality of receiver devices and a plurality of known input values relating to the plurality of known latency values; and where the method further comprises:

predicting, based on the relationship, one or more unknown latency values; and outputting the one or more unknown latency values.

* * * * *